Oct. 7, 1952 G. W. SCHATZMAN 2,613,092
FENDER SHIELD LATCHING DEVICE
Filed Aug. 15, 1947 2 SHEETS—SHEET 1
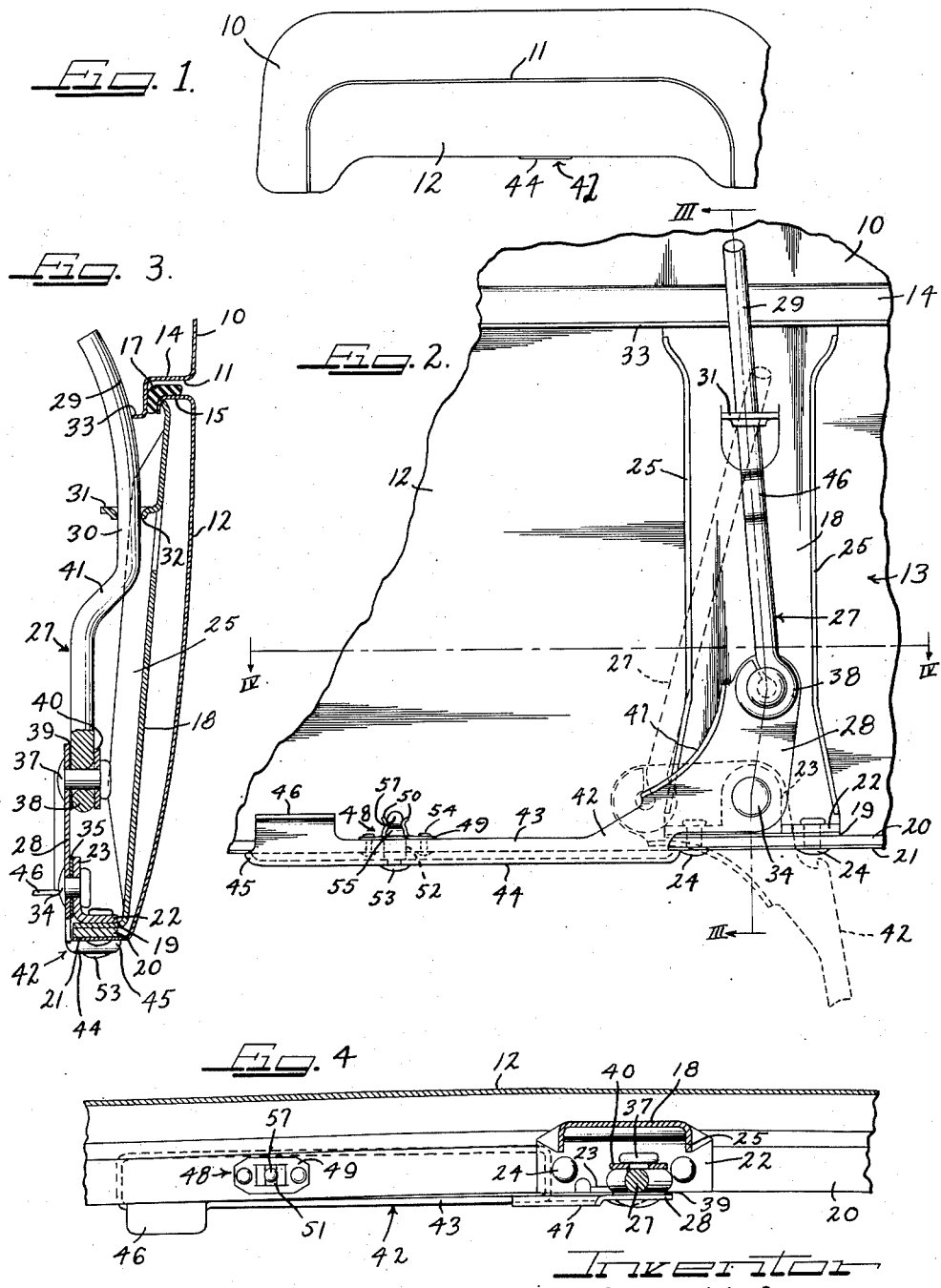
Inventor
GEORGE W. SCHATZMAN.

Oct. 7, 1952 G. W. SCHATZMAN 2,613,092
FENDER SHIELD LATCHING DEVICE
Filed Aug. 15, 1947 2 SHEETS—SHEET 2
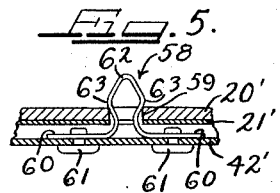
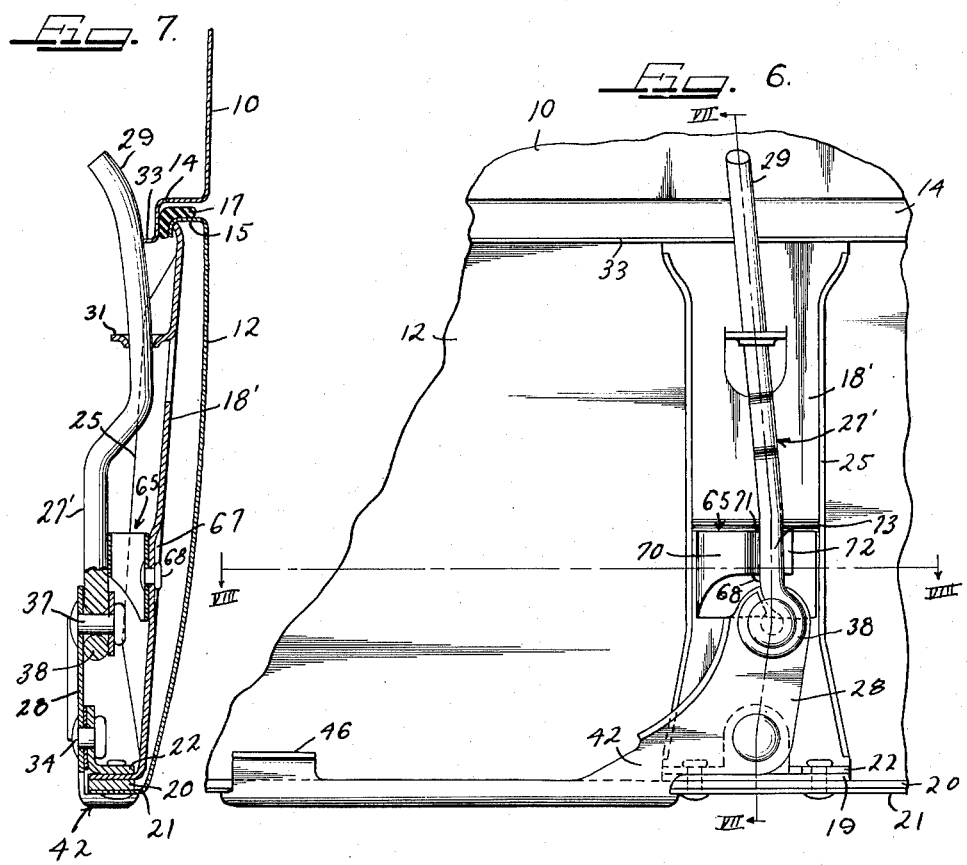
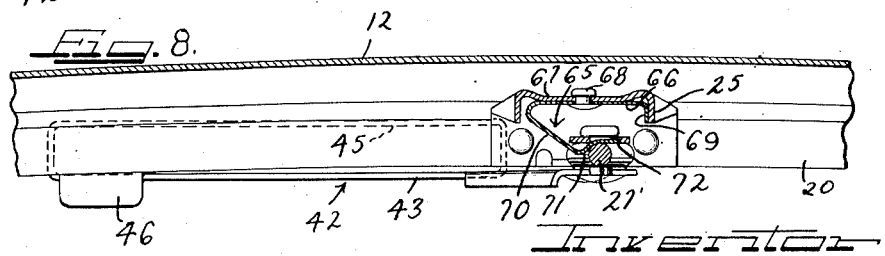
Inventor
GEORGE W. SCHATZMAN.

Patented Oct. 7, 1952

2,613,092

UNITED STATES PATENT OFFICE 2,613,092

FENDER SHIELD LATCHING DEVICE

George W. Schatzman, Detroit, Mich., assignor to Houdaille-Hershey Corporation, Detroit, Mich., a corporation of Michigan Application August 15, 1947, Serial No. 768,915

5 Claims. (Cl. 292—66)

This invention relates to improvements in fender shields and more particularly concerns novel latching devices by which the fender shields are held in place on the fenders with which associated.

In the vehicle industry, and particularly in the automobile industry, various means have been utilized to improve the appearance of vehicle fenders. The usual vehicle fender is provided with an opening affording access to the vehicle wheel and permitting ready removal or replacement of the wheel in an axial direction. Since this opening inherently presents an unattractive outward appearance, detachable fender shields have been employed to cover the opening ornamentally.

As the term "fender shield" shall hereinafter be employed, it refers to any member which is adapted to be secured to a fender or other portion of a vehicle body for the purpose of covering the opening in the fender or vehicle body provided for access to or removal of a vehicle wheel. Furthermore, as the term "fender" shall hereinafter be employed, it refers to any form of wheel fender in its broad sense, whether such fender be separated from the vehicle body, partly separated from the vehicle body, or actually an integral part of the vehicle body and whether or not it projects outwardly from the principal body portion of the vehicle.

An important object of the present invention is to provide novel means for latching a fender shield in position on a fender.

Another object of the invention is to provide a fender shield having improved latching mechanism.

A further object of the invention is to provide an improved fender shield latching mechanism including a toggle link operating structure.

Still another object of the invention is to provide an improved fender shield latching mechanism which is simple and efficient in operation and involves but a small number of inexpensive, low cost, rugged parts susceptible of economical mass production methods of manufacture and assembly.

Other objects, features and advantages of the present invention will be readily apparent from the following detailed description of certain preferred embodiments thereof taken in conjunction with the accompanying two sheets of drawings, in which:

Fig. 1 is a fragmentary outside elevational view of a fender and fender shield assembly embodying features of the present invention;

Fig. 2 is an enlarged fragmentary inside elevational view of the fender and fender shield assembly showing one form of the novel fender shield latching mechanism of the present invention;

Fig. 3 is a vertical sectional view taken substantially on the line III—III of Fig. 2;

Fig. 4 is a horizontal sectional view taken substantially on the line IV—IV of Fig. 2;

Fig. 5 is a fragmentary vertical sectional detail view of a slightly modified form of latch handle retaining means;

Fig. 6 is a fragmentary rear elevational view, similar to Fig. 2, but showing a further slight modification involving a different type of latch retaining means;

Fig. 7 is a vertical sectional view taken substantially on the line VII—VII of Fig. 6; and Fig. 8 is a horizontal sectional view taken substantially on the line VIII—VIII of Fig. 6.

Having reference to Fig. 1, a fender 10 has a wheel access opening 11 which is normally closed by a fender shield 12, sometimes also referred to as a fender skirt, which is held in place in the opening 11 by any suitable means located at the ends of the fender shield and interengageable with the fender, or means carried by the fender and interengageable by appropriate means at the ends of the fender shield, and of such a character that the fender shield can be conveniently mounted on the fender or removed as desired.

In the present instance, the fender shield 12 is of the type which is adapted to be mounted initially and primarily at its ends, that is, the ends of the fender shield are first placed in association with the fender 10 at the opening 11 and the principal load or weight of the fender shield is sustained by the interconnections effective at the ends of the fender shield. Then, as a final maneuver in mounting the fender shield, a centrally located latching mechanism, herein generally identified by the numeral 13 (Fig. 2), is operated to retain the fender shield in fully mounted, access opening concealing relation to the fender.

Herein the fender and fender shield are so related in the closed condition of the fender shield that the latter lies substantially flush with the outer surface of the fender. For this purpose, the fender is provided with a marginal angular inset flange 14 (Fig. 3) providing, in effect, a rabbet about the opening 11 receptive of marginal inturned angular flange 15 on the fender shield 12 and carrying a cushioning gasket 17 which fits against at least the downwardly projecting leg of the fender flange 14. In assembly, the gasket 17 is compressed or squeezed between the fender flange 15 and the fender shield flange 14 to maintain a rattle-free relationship between the fender shield and the fender.

By preference, the fender shield latching mechanism 13 is constructed as a substantially centrally located unit comprising a fender shield reinforcing and latch guiding strut 18 (Figs. 2 to 4) which may be formed as a sheet metal stamping of elongated form having the upper end thereof engaging within the reentrant corner formed by the angular upper marginal flange 15 on the fender shield, and having its lower end portion formed as a foot flange 19 resting upon a reinforcing bar 20 carried by an inwardly extending generally horizontal flange 21 integrally formed at the lower margin of the fender shield 12 (Figs. 2 and 3). Resting upon the foot flange 19 is a bar 22 having along its inner edge an upstanding ear 23, the inner surface of which is preferably approximately in a plane with the inner edges of the foot flange 19, the reinforcing bar 20 and the lower fender shield reinforcing flange 21, or at least the furthest inwardly projecting one of such elements. The bar 22 is secured to the foot flange 19 and the latter and the reinforcing bar 20 in assembly are secured to the lower fender shield flange 21 by such means as rivets 24. For rigidity, the strut member 18 may be formed substantially channel-shape and has longitudinal side reinforcing flanges 25.

Supported by the strut 18 and the ear 23 is an articulated latch structure including a latch rod 27 and a toggle link member 28.

The latch rod 27 has an upper cam end portion 29 preferably formed on a relatively large inturned radius merging with a guided portion 30 which is substantially straight and extends slidably through a guide eye 31 formed as an integral apertured struck out tongue or ear on the strut 18 and formed with a downturned annular flange 32 providing a relatively smooth bearing lip defining the eye aperture. There is sufficient play in the eye 31 so that the latch rod 27 can be reciprocably and rockably moved through and in the eye between latching and non-latching positions as indicated in full lines and dash lines, respectively, in Fig. 2. In the latching position, the cam head 29 engages an inturned bearing flange portion 33 on the inner extremity of the fender marginal flange 14, and the relationship between the cam head 29 and the adjacent upper margin of the fender shield 12 is such that the upper margin of the fender shield is drawn toward the downward leg of the fender flange 14 to place the gasket 17 under compression. In its non-latching position, the latch rod 27 entirely clears the fender flange 14 so that the fender shield can be freely removed from the fender or replaced.

Movement of the latch rod 27 between the latching and non-latching positions thereof is effected by the toggle link 28 which is pivotally secured adjacent its lower end as by means of a rivet 34 to the supporting ear 23, a spacer washer 35 being preferably interposed between the ear and the adjacent surface of the toggle link member. Spaced upwardly from the pivot 34, the toggle link 28 is connected by means such as a rivet 37 to the lower end portion of the latch rod 27 which for this purpose is formed with an integral eye loop 38. To assure free, smooth pivotal movement, a spacer washer 39 may be interposed between the adjacent face of the link 28 and the eye loop 38 and a bearing washer 40 may be interposed between the eye and the head of the rivet 37 which is on the other side of the eye 38 from the link 28.

In order to accommodate the lower end portion of the latch rod 27 to the plane of the link 28 for pivotal movement about the axis of the connecting rivet 37, the lower end portion of the rod is offset inwardly by means of a bend 41 from the vertical guide portion 30.

For manual actuation of the toggle link 28, a handle 42 is provided as an extension from one side of the link, substantially bell crank fashion. Hence, the link 28 and the handle 42 may be formed integrally from a single sheet metal stamping, the handle 42 comprising a formation right angular in cross section including a longitudinal side flange 43 formed in the plane of the link 28 and an underturned horizontal longitudinal body flange 44 which rigidifies the flange 43. The body flange 44 is preferably rigidified by an embossed formation providing a turned-up marginal reinforcing flange 45, which has its edge formed in a plane to abut the undersurface of the adjacent portion of the fender shield lower marginal reinforcing flange 21 in the latching condition of the mechanism.

Adjacent to its extremity, the handle side flange 43 is formed with a generally inwardly turned tongue 46 providing a convenient finger hold whereby the handle is adapted to be engaged conveniently for manipulating the toggle link. For purpose of rigidity the reentrant angle between the link 28 and the integral handle 42 is reinforced by an inturned flange 47.

The construction and arrangement of the toggle link 28 and the handle 42 is such that when the handle is swung down from the full line position, shown in Fig. 2, wherein the marginal flange formation 45 of the handle engages under the fender shield reinforcing flange 21, to the broken line position shown, the latch rod 27 is moved down to the non-latching position. When the handle 42 is swung back to engagement with the fender shield flange 21, the latch rod 27 is moved to latching position in which the latch rod pivot 37 is preferably carried over-center with regard to the toggle link pivot 34. The latter relationship tends to maintain the latching position of the latch rod 27 since thereby the counterthrust imposed by the camming interrelationship of the cam head 29 with the flange 33 on the fender normally tends to hold the latch rod and toggle link assembly against unlatching movement.

As an added precaution against accidental movement of the latching mechanism to the non-latching position, means are provided for effecting a positive, holding interconnection with a part of the mechanism. In one form, as best seen in Figs. 2 and 4, such means comprises a resilient spring catch device 48 including a plate 49 having a pair of opposed integral, spaced, opposing bowed spring fingers 50 struck up at opposite sides of an opening 51 in the plate registering with an aperture 52 formed in the lower marginal flange 21 of the fender shield and the reinforcing bar 20 to clear a catch pin 53 therethrough. Means such as rivets 54 may secure the plate 49 in place. The catch pin 53 may be riveted to the lower flange 44 of the handle and extends upwardly so that when the handle 42 is in the latching position, the upper end portion of the pin 53 extends upwardly through the aperture 52 and into engagement with the spring retaining fingers 50 acting as jaws to grip the same retainingly. An annular groove 55 in the pin receives the fingers 50 retainingly, and a ball detent tip 57 on the pin provides a cam surface for camming into and out of engagement with the fingers 50 responsive to manual force exerted through the handle 42.

In another form of spring catch, as shown in Fig. 5, the handle 42' is equipped with a spring detent member 58 yieldably engageable through an appropriately dimensioned opening 59 formed through the lower marginal fender shield flange 21' and the superimposed reinforcing bar 20'. The spring detent 58 comprises a spring metal strip having the end portions formed as parallel oppositely extending base flanges 60 secured to the handle 42' by means such as rivets 61 and with the central portion thereof looped up to provide a detent head 62 having resilient oppositely bowed retaining shoulders 63 at the opposite sides thereof and formed with an overall distance between their major projections slightly greater than the aperture 59. Thereby movement of the handle 42' away from or toward the flange 21' causes the spring detent 58 to leave or enter the aperture 59, the head 62 compressing and expanding as required for this purpose.

In another form of spring catch, as shown in Figs. 6 to 8, inclusive, a spring clip retainer 65 is provided for engagement with the latch rod 27' of a latching mechanism, which in most other respects is substantially identical with the latching mechanism of Fig. 2 and similar reference numerals therefor indicate identical parts. The spring catch 65 comprises a looped spring metal strip comprising a base flange 66 arranged to rest against an inset portion 67 in the body of the strut 18' parallel with the plane of the toggle link 28 and to which the flange 66 is secured as by means of a rivet 68. At one end the flange 66 has a right angular flange 69 which abuts the adjacent reinforcing flange 25 of the strut and holds the catch against turning about the single rivet 68.

At its opposite end the base flange 66 is formed with an integral yieldable cam flange 70 which extends obliquely inwardly toward the latch rod 27' and somewhat beyond the adjacent movement plane thereof and is formed at its inner extremity with an inturned oblique retaining and cam shoulder 71 which merges with an extremity seating flange 72. The retaining or keeper shoulder 71 and the seating flange 72 are so disposed that in the full latching position of the latch rod 27' a portion of the rod identified at 73 is retainingly engaged against accidental swinging movement of the rod out of the latching position. The portion 73 is, for convenience, formed to extend vertically parallel to the keeper shoulder 71 in the latching position of the latch rod. Thus, when the latch rod 27' is moved toward latching position by manual force applied through the handle 42, the portion 73 thereof cams against the cam flange 70, depressing the same until the rod portion 73 passes the keeper shoulder 71 whereupon the resilient flange 70 snaps the shoulder 71 into retaining position, with the seating flange 72 bearing against the rod portion 73. In the reverse movement of the latch rod 27', that is, to non-latching position through manual force applied through the handle 42, the latch rod 27' is levered past the retaining shoulder 71 acting as a cam to depress the flange 70 until the latch rod has escaped from the spring catch 65.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In combination in a fender shield latching structure of the character described, a reciprocable and swingable latch rod, a link, a handle on said link, and a looped spring detent catch member carried by the handle and engageable with a rigid structure of the fender shield for holding the handle in the latched condition of the latch rod.

2. In combination with a fender shield, a supporting structure carried by the fender shield, the fender shield having a lower marginal flange extending inwardly, a link pivotally carried by said supporting structure, a reciprocable latch rod arranged to be actuated through said link, an actuating handle for the link engageable under the flange of the fender shield, an upwardly protruding member carried by said handle, said flange of the fender shield having an aperture therein for clearing said upwardly extending member, and a reinforcing bar carried by the fender shield flange and providing an edge above said aperture engageable by said upstanding member.

3. In combination in a latching mechanism for a fender shield, a vertical strut, a latch rod, means carried by said strut for reciprocably and rockably supporting said rod, and a spring member comprising a looped spring band having a flange secured to the strut and a spring flange including a cam portion and a keeper shoulder portion, the keeper shoulder portion including a seating flange terminal, said cam flange portion being disposed for engagement and deflection by the latch rod as it is moved toward latching position and said keeper shoulder having cam characteristics adapting the same to be deflected resiliently out of the path of the rod upon movement of the rod to non-latching position.

4. In combination in a fender shield latching mechanism of the character described, a vertical supporting member, a bearing structure on the upper portion of said supporting member affording a vertical axis bearing eye, a latch rod reciprocably guided in said bearing eye, a link pivotally mounted at the lower end of said supporting structure and pivotally connected above said pivotal mounting to said latch rod, and an elongated generally horizontally disposed handle member of dished reinforced form having a narrow flange along its inner longitudinal edge, said handle member being connected to said link so that the handle member can engage under a fender shield marginal flange with said narrow flange along side the inner edge of the fender shield flange, the distal end portion of the narrow handle flange having an upwardly and inwardly turned tongue extension providing a finger hold for manipulating the handle member to operate said link.

5. In combination in a fender shield latching mechanism of the character described, a vertical supporting member, a bearing structure on the upper portion of said supporting member affording a vertical axis bearing eye, a latch rod reciprocably guided in said bearing eye, a link pivotally mounted at the lower end of said supporting structure and pivotally connected above said pivotal mounting to said latch rod, and an elongated generally horizontally disposed handle member of dished reinforced form having a narrow flange along its inner longitudinal edge, said handle member being connected to said link so that the handle member can engage under a fender shield marginal flange with said narrow flange along side the inner edge of the fender shield flange, the distal end portion of the narrow handle flange having an upwardly and inwardly turned tongue extension providing a finger hold for manipulating the handle member to operate said link, said handle member having latch mechanism thereon engageable with complementary engageable structure on the fender shield to hold the handle member normally against displacement until manipulated through the medium of said tongue for disengaging the latch mechanism.

GEORGE W. SCHATZMAN.

REFERENCES CITED

The following references are of record in the file of this patent:

UNITED STATES PATENTS

| Number | Name | Date |
|---|---|---|
| 189,927 | Everest | Apr. 24, 1877 |
| 674,592 | Baker | May 21, 1901 |
| 706,845 | McBride | Aug. 12, 1902 |
| 1,396,942 | Schroeder | Nov. 15, 1921 |
| 1,760,187 | Brenne | May 27, 1930 |
| 1,929,341 | Wegner | Oct. 3, 1933 |
| 2,078,417 | Schaefer | Apr. 27, 1937 |
| 2,115,768 | Haltenberger | May 3, 1938 |
| 2,151,284 | Tinnerman | Mar. 21, 1939 |
| 2,202,904 | Fergueson | June 4, 1940 |
| 2,302,415 | Buchanan | Nov. 17, 1942 |
| 2,349,466 | Schueren | May 23, 1944 |
| 2,530,402 | Schatzman | Nov. 21, 1950 |